United States Patent [19]

Eggenmueller

[11] Patent Number: 4,999,987
[45] Date of Patent: Mar. 19, 1991

[54] APPARATUS FOR HARVESTING OF FIELD-FODDER

[75] Inventor: Alfred Eggenmueller, Moers, Fed. Rep. of Germany

[73] Assignee: Karl Mengele & Söhne, Fed. Rep. of Germany

[21] Appl. No.: 294,011

[22] Filed: Jan. 6, 1989

[30] Foreign Application Priority Data

Jan. 11, 1988 [DE] Fed. Rep. of Germany ....... 3800479
Jun. 1, 1988 [DE] Fed. Rep. of Germany ....... 3818578
Aug. 30, 1988 [DE] Fed. Rep. of Germany ....... 3829314

[51] Int. Cl.[5] ........................................... A01D 39/00
[52] U.S. Cl. ........................................ 56/341; 56/344; 100/189
[58] Field of Search ................... 56/341, 344, DIG. 2, 56/364; 100/189, 188 R, 142, 208

[56] References Cited

U.S. PATENT DOCUMENTS

| 3,384,007 | 5/1968 | Boje et al. ............... 100/188 R X |
| 4,157,643 | 6/1979 | White ................... 56/341 |
| 4,170,934 | 10/1979 | Oosterling et al. ............... 56/344 X |
| 4,275,550 | 6/1981 | Swenson et al. ................... 56/341 |
| 4,372,104 | 2/1983 | Simonis et al. ................... 56/341 |
| 4,604,858 | 8/1986 | Esan et al. ................... 56/341 |
| 4,782,651 | 11/1988 | Ratzlaff ................... 56/341 |
| 4,803,832 | 2/1989 | Crawford ................... 56/341 |

FOREIGN PATENT DOCUMENTS

| 74533 | 3/1983 | European Pat. Off. .............. 56/344 |
| 120780 | 10/1984 | European Pat. Off. .............. 56/341 |
| 3239932 | 5/1984 | Fed. Rep. of Germany ........ 56/344 |
| 3439035 | 4/1986 | Fed. Rep. of Germany ........ 56/344 |
| 3445015 | 10/1987 | Fed. Rep. of Germany . |
| 8501745 | 1/1987 | Netherlands ........................ 56/341 |

Primary Examiner—Hoang C. Dang
Attorney, Agent, or Firm—Lowe, Price, LeBlanc, Becker & Shur

[57] ABSTRACT

In an agricultural pick-up baler, forming rectangular bales of harvested agricultural material or field fodder like hay, straw, grass-silage, the agricultural material is loaded to a compressing device shredding and crushing the fodder to a highly densified tough layer, urged to a baling chamber via a press channel. The fed-in position of the layer is then additionally densified and compacted at its flat side by a pressing plate against the resistance of friction within the baling chamber with simultaneous extruding said rectangular bale through a rear discharge opening of said baling chamber. By the method and apparatus according to the invention properly shaped and highly densified bales are produced with relatively light-weighted and simple-driven compacting structural elements. Thus, the massive and expensive pitman-and-crank-assembly of conventional balers can be avoided.

2 Claims, 8 Drawing Sheets

APPARATUS FOR HARVESTING OF FIELD-FODDER

FIELD OF THE INVENTION

The present invention generally relates to agricultural crop balers and, more particularly, to a method and an apparatus for harvesting of agricultural material like hay, straw, grass-silage or corn wherein the material is picked-up from the ground, compressed by a tine-drum and loaded into a baling chamber to form a rectangular bale.

BACKGROUND OF THE PRIOR ART

Most of so-called large or big square balers in use work according U.S. Pat. No. 4,372,104, wherein a pick-up device loads harvested agricultural material into a supply passage, connected to the inlet opening of a compressing channel. A pressing ram is reciprocated back and forth in a horizontally arranged compressing channel by at least one plunger for compacting the material to a big square bale up to a weight of one ton. Usually, the drive assembly of the plunger is a pitman-and-crank-assembly coupled to a gear-box, as shown in U.S. Pat. Nos. 4,525,991 or 4,782,651, respectively. These drive means are rather voluminous and have many components, thus being relatively expensive to produce.

The agricultural material is moved through the supply passage to the compressing channel by a conveying or feeding device extending into the supply passage with a plurality of fork-like fingers or tines. The crop entering the compressing channel, is only partially compressed by the tines of this feeding device, and oscillates in a kidney-shaped path of travel. Thus the main compacting work has to be done by said pressing ram, which has to be very strongly built. Furthermore, the drive means of the feeding mechanism is rather complicated.

As the agricultural material has a certain elasticity when compressed, the compressed material re-expands upon the return movement of the reciprocating ram. Thus, with this method the material is compressed several times, causing a loss of energy, and the degree of compression is relatively low due to the re-expansion of the material.

The German Patent No. 34 45 015 discloses a rotary compressing drum with tines, the tips of which engage grooves in the drum casing, thus shredding and crushing the material. In this way a densified layer is produced, which is accumulated in a box to a rectangular bale.

Although the degree of compression is higher than with the above-mentioned usual big balers, it is desirable to improve the density to achieve highly densified bales which may be transported and stored within a minimum space.

Furthermore, the forming of a rectangular bale according to the German Patent No. 34 45 015 is very complicated, as the layers are piled up in a generally vertical box by lowering the ground-plate of this box step-by-step. Thus, the size of the accumulated bale is very difficult to change. After forming one big bale consisting of about ten to twenty layers the ground-plate has to be lifted in only a few seconds, as the feeding of the material is continuous. The doors of the box have to be opened and the knotting device has to be operated by a very complicated hydraulic control circuit. Thus, continuous, fast operation of the crop-baler is very difficult to achieve.

SUMMARY OF THE INVENTION

It is a primary object of the present invention to provide a method for harvesting of agricultural material achieving a higher compression of the material in a continuous, fast operation of a crop-baler.

It is a further object of the invention to provide an apparatus for harvesting of agricultural material, achieving a high compression without re-expansion of the bale.

It is further object of the invention to provide a compact design of the baler and drive means having a small number of components.

It is another object of the invention to provide a bale forming apparatus allowing the quick and simple change of the bale size.

Still another object of the invention is to provide a baler allowing continuous, fast operation in the field.

SUMMARY OF THE INVENTION

These and other objects are obtained by a method for harvesting of field-fodder and forming substantially rectangular bales thereof in a baling chamber, comprising the steps of picking-up said field-fodder from the ground, compressing said field-fodder by shredding and crushing thereof between tines of a compressing drum and grooves of a drum casing to a highly densified layer; urging said densified layer through a press channel to an inlet opening of said baling chamber; further compressing said layer at a flat side thereof against the resistance of friction within said baling chamber with simultaneous extruding of said rectangular bale through a rear discharge opening of said baling chamber.

According to another aspect of the invention there is provided an apparatus for harvesting of field-fodder like hay, straw, grass-silage and forming substantially rectangular bales thereof in a baling chamber comprising:
- pick-up means for picking up said field-fodder from the ground; a compressing drum provided with tines engaging grooves of a drum casing and a slotted top wall of a press channel for shredding and crushing said field-fodder picked up by said pickup means to a highly densified layer;
- a press channel forming an output of said compression drum, having a slotted portion for permitting passage of said tines and conveying said layer formed in said compression drum by further densifying said layer through an inlet opening into said baling chamber; and
- a pressing plate arranged at an end surface of said baling chamber and movable in said baling chamber in a longitudinal direction of said baling chamber for pressing said layers accumulating in said baling chamber in said direction toward an discharge opening of said baling chamber.

As the result of this method and apparatus according the invention the already densified layer is further compressed and compacted at its flat side thus increasing the degree of density of the rectangular bale. Since the agricultural material fed into the baling chamber is already pre-densified by the compressing drum and the press channel the drive means of the compressing plate may be designed to be simple and less strong. By further compressing the layer at its flat or main side, a re-expansion is avoided since in contrast to the known big balers the crop material is not loosely fed into the baling chamber but as a high-densified layer. In contrast to the apparatus of the German Patent No. 34 45 015 the dimensions of the rectangular bale, especially the length of the bale, may be easily changed by varying the number of compressed layers.

With this method and apparatus it is not necessary to use haydogs or the like as they are used in connection with the bale chamber in U.S. Pat. No. 4,782,651 for holding a freshly compacted charge of material against retrograde movement after being pressed rearwardly by the plunger, because the highly densified layer which is cut off near the inlet opening does not re-expand.

Due to this method the layers and the resulting rectangular bale remain well shaped and form fitting, thus enabling a high degree of compression to be achieved with low energy expenditure.

In a preferred embodiment, the main compression by the tine-drum arrangement is very high, so that the layer in the press-channel will not be compressed in longitudinal direction anymore. To enable a continuous operation of the crop baler during the forward movement of compressing-plate into the baling chamber there is provided a slotted lateral wall, which is displaceable in a longitudinal direction of that press channel, thus interrupting the supply of the high-densified layer to the press channel by the compressing-drum.

Another possibility to reach continuous operation is to form the compressing plate of two or more telescopable parts which may be moved in longitudinal direction of said press channel. In this way the further compressed rectangular bale is held in its position whilst the layer is fed from the press channel into the baling chamber without any interruption.

DESCRIPTION OF THE PREFERRED EMBODIMENTS

Figure 1:
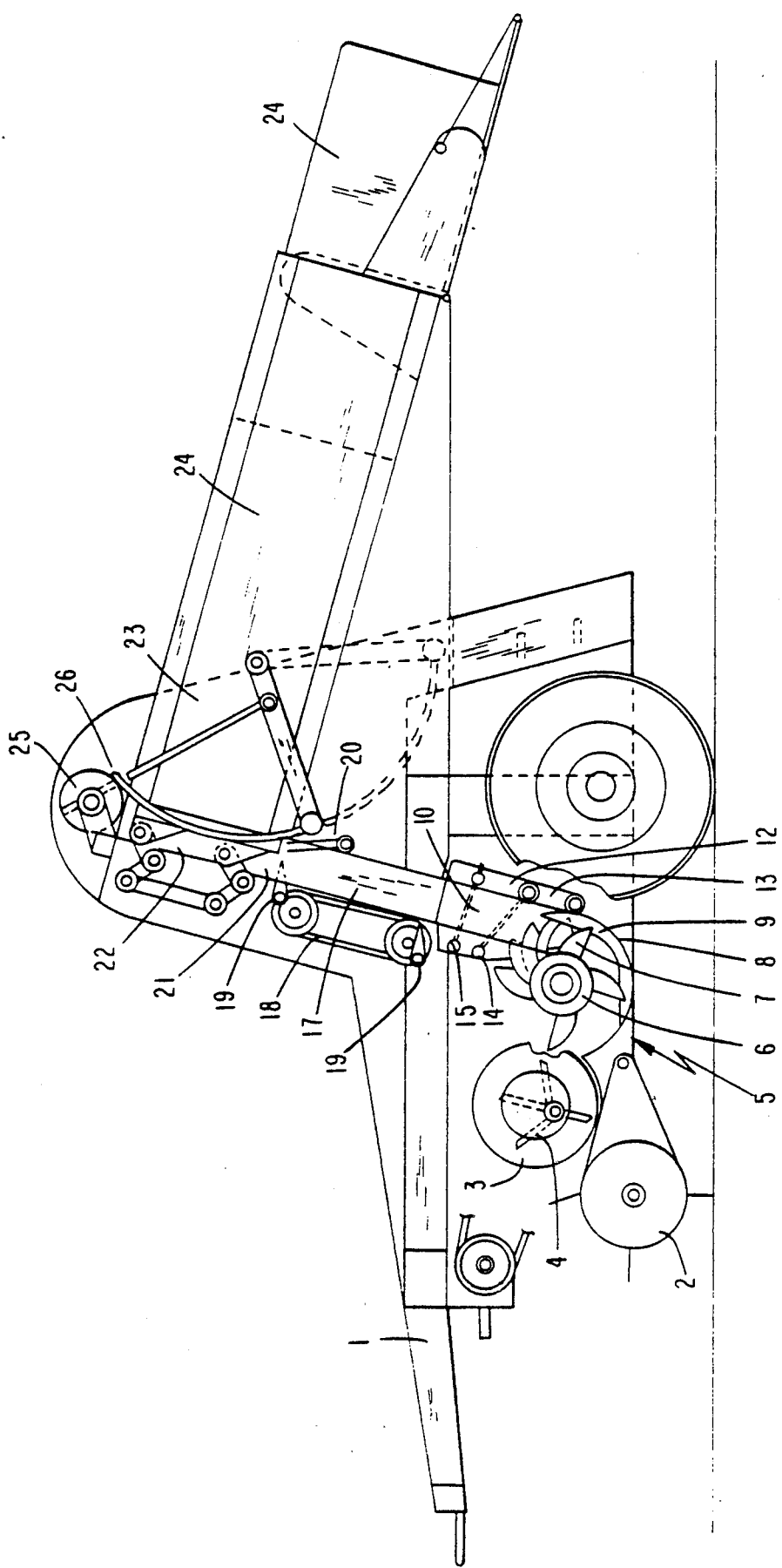
FIG. 1 is a schematic elevational view of a crop baler constructed in accordance with a preferred embodiment of the present invention, various phantom lines being utilized to illustrate operating positions of the cooperating components of the baler.

FIG. 1 shows a preferred first embodiment of a baler according to the invention, comprising a frame 1 on which is mounted a pick-up device 2 for taking up the field-fodder from the ground with the baler travelling over the field. The crop is transferred to a center gathering auger 3 with a central packing device 4 to supply the crop to the compressing device 5. The latter consists of a drum 6 provided with radially projecting tines 7 arranged in a twisted winding around the drum 6. The tips of the tines 7 engage with a plurality of grooves 9 formed in a drum casing 8. For further details of this arrangement and the design of the press-channel, reference may be had to the German Patent 34 45 015.

The field-fodder crushed and shredded in this compressing device 5 is fed by the drum 6 into a press channel 10 which is formed by a slotted wall 11 (shown in FIG. 5-8), an adjustable bottom wall 12 and side walls 16. Adjusting means for adjusting the bottom wall 12 and/or a wall 15 which is an extension of the slotted wall 11 are enumerated with 13 and 14. These adjusting means 13,14 are used to vary the cross-section of the press channel 10 in order to vary the density of the layer, which is output by the compressing device 5.

Extending the press channel 10 a buffer-part 17 is provided to store the compressed layer when an inlet opening 21 of the baling chamber 23 is closed. Preferably the length of said buffer-part 17 of the press channel 10 corresponds to the height of the baling chamber 23. In this buffer-part 17 of the press channel 10 a conveying device 18 having forks 19 may be arranged for additional urging the layer into the baling chamber 23. This conveying device 18 is not absolutely necessary for the operation of the crop baler, as it may be gathered from FIG. 4 to FIG. 8, wherein the press channel 10 is designed without any conveying device 18. In the embodiment according to FIG. 1 the conveying device 18 transfers a compressed layer stored in the buffer-part 17, into the baling chamber 23 through its inlet opening 21, when detected by a detector 20.

The baling chamber 23 has a rectangular cross-section and is fixed on the frame 1, extending generally horizontally to a rear discharge opening of the baling chamber 23. After transferring said layer through the inlet opening 21, the layer is pressed towards the rear discharge opening by the compressing-plate 22, which is reciprocable by distance corresponding to the width of the layer which in turn corresponds to the width of the press channel 10. By moving to the right in FIG. 1, the compressing plate 22 presses against the flat or main side of the layer against the resistance of friction within said baling chamber 23 increasing the density of the layers and the rectangular bale 24 formed thereof. When the rectangular bale 24 reaches the desired length, which is nearly the length of the baling chamber 23 (see FIG. 1), a knotting device 25 and a knotting needle 26 is actuated as shown in FIG. 1. It may be gathered from FIG. 1, that a first rectangular bale 24 is just being knotted, whilst (on the right portion of FIG. 1) a second rectangular bale 24 is extruded through the discharge opening of the baling chamber 23. This is also shown in FIG. 2, wherein four twines, which may be of sisal, plastic or wire, are wound around the second bale 24, just leaving the baling chamber 23.

Figure 2:
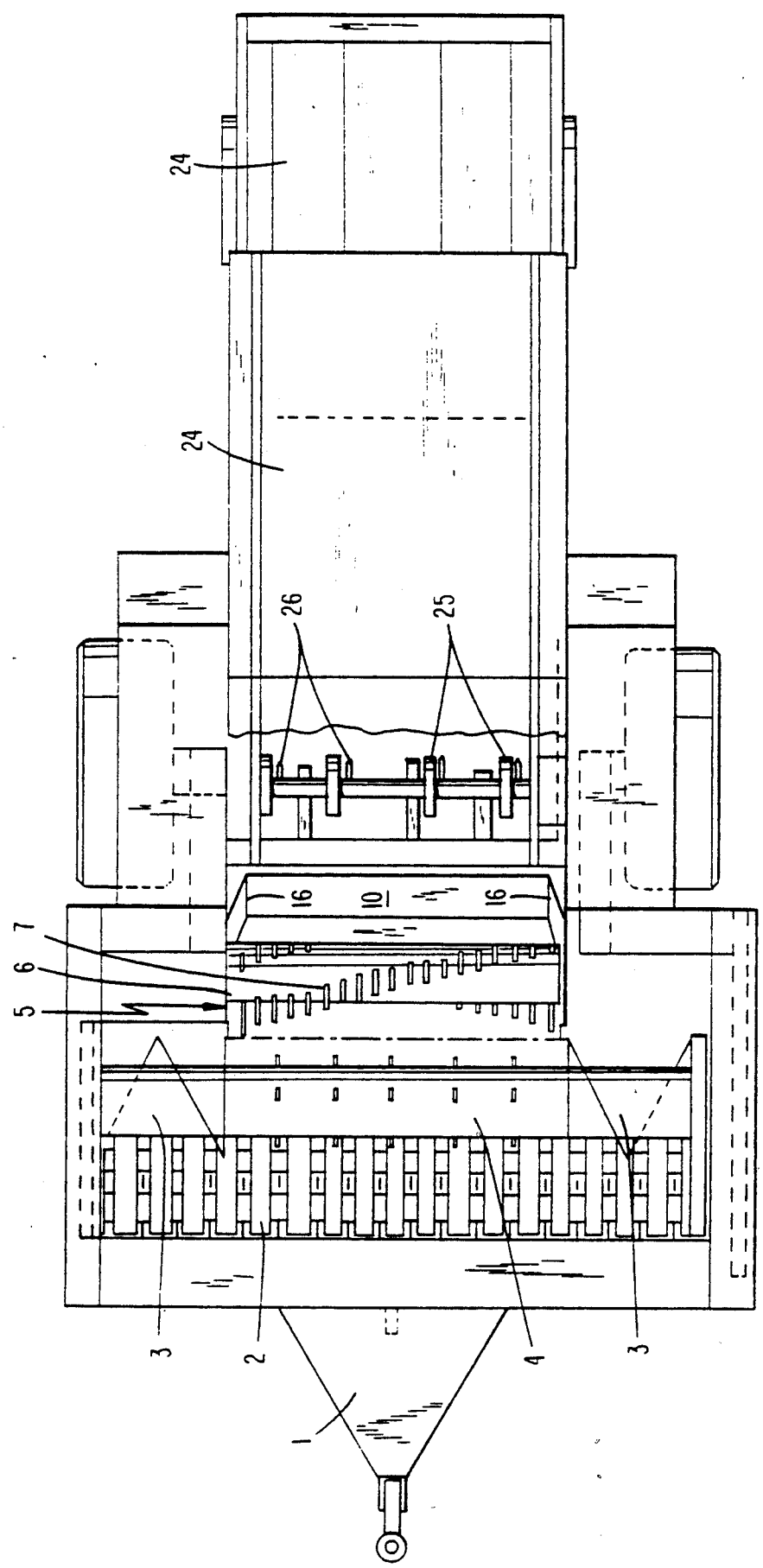
FIG. 2 is a sectional top view on the baler according to FIG. 1.

FIG. 2 illustrates the baler of FIG. 1 in a plan view, especially showing the arrangement of the tines 7 in a twisted winding and the cross-section of the press channel 10. Further, the cross-section of the layer, formed in this press channel 10, may be gathered from this view.

Figure 3:
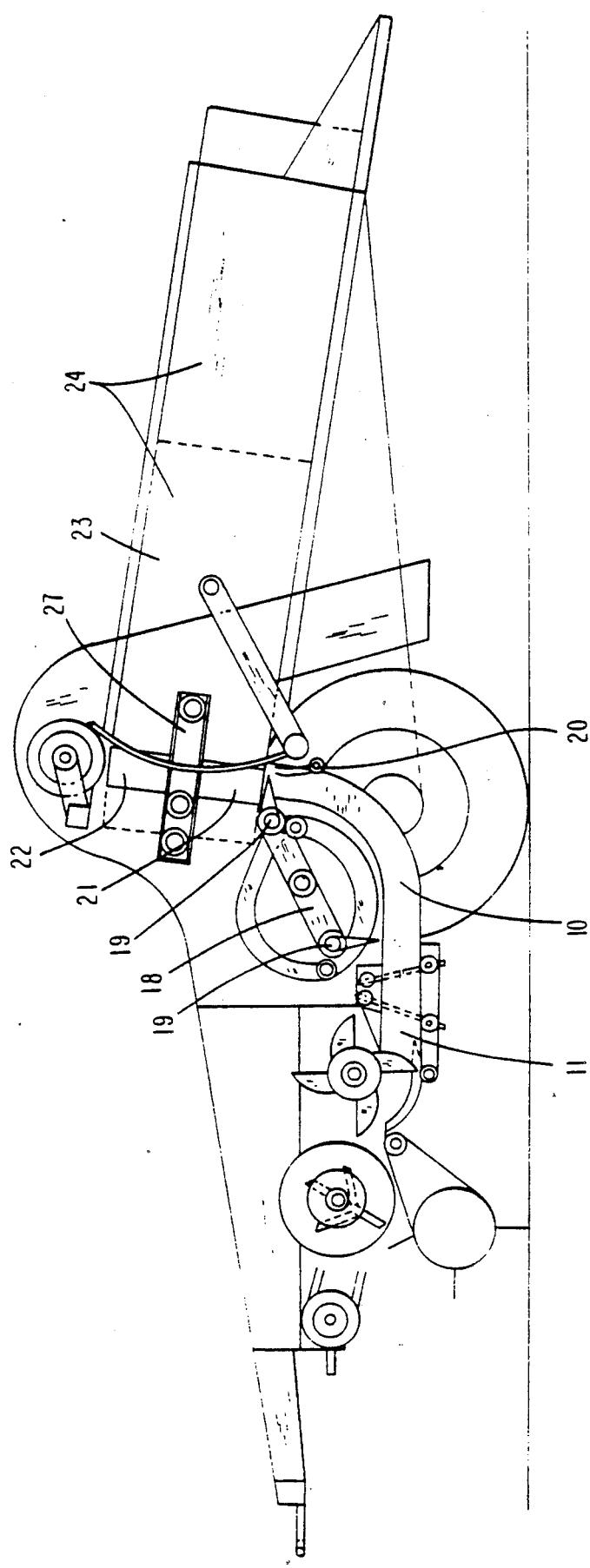
FIG. 3 shows another embodiment of the invention.

According to FIG. 3 the press channel 10 is arranged generally horizontally to reduce the overall height of the baling apparatus. In contrast to the embodiment of FIG. 1 the conveying device 18 is designed as a rotary conveyor with two forks 19, engaging the kidney-shaped press channel 10 alternatively on command of the detector 20, as a variation of the chain conveyor in FIG. 1. The compressing plate 22 in this embodiment is guided by a roller guide 27, instead of a lever guide in FIG. 1.

Figure 4:
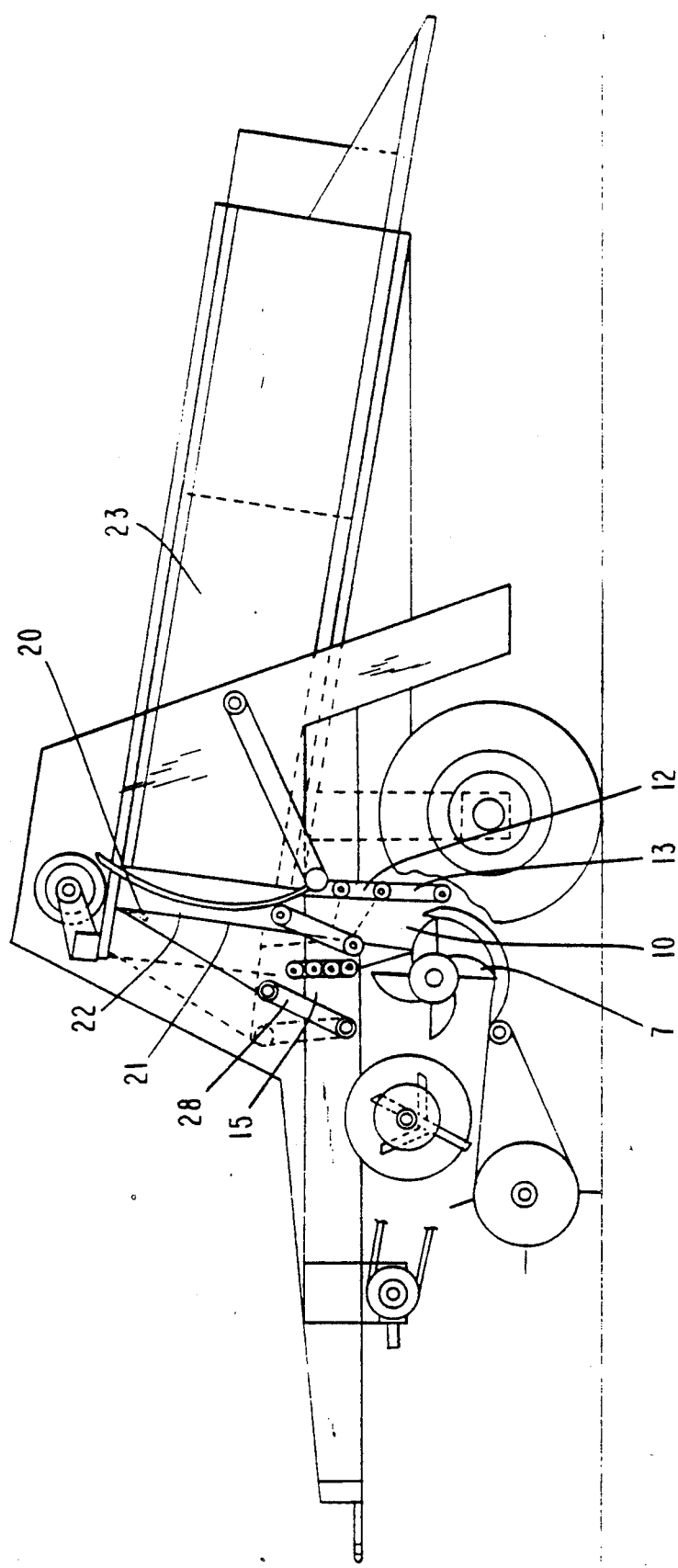
FIG. 4 shows another embodiment of the invention similar to that of FIG. 1.

FIG. 4 shows a preferred embodiment of the invention without the conveying device 18 of FIG. 1 or 3. Here the compressing drum 6 urges the compressed layer directly through the relatively short press channel 10 into the baling chamber 23. Consequently, the detector 20, initializing the movement of the compressing plate 22 is arranged at the upper side of the baling chamber 23. The compressing plate 22 is guided by swing-levers 28 to ensure the reciprocating movement of the compressing-plate 22 forth and back, as indicated by phantom lines.

Figure 5:
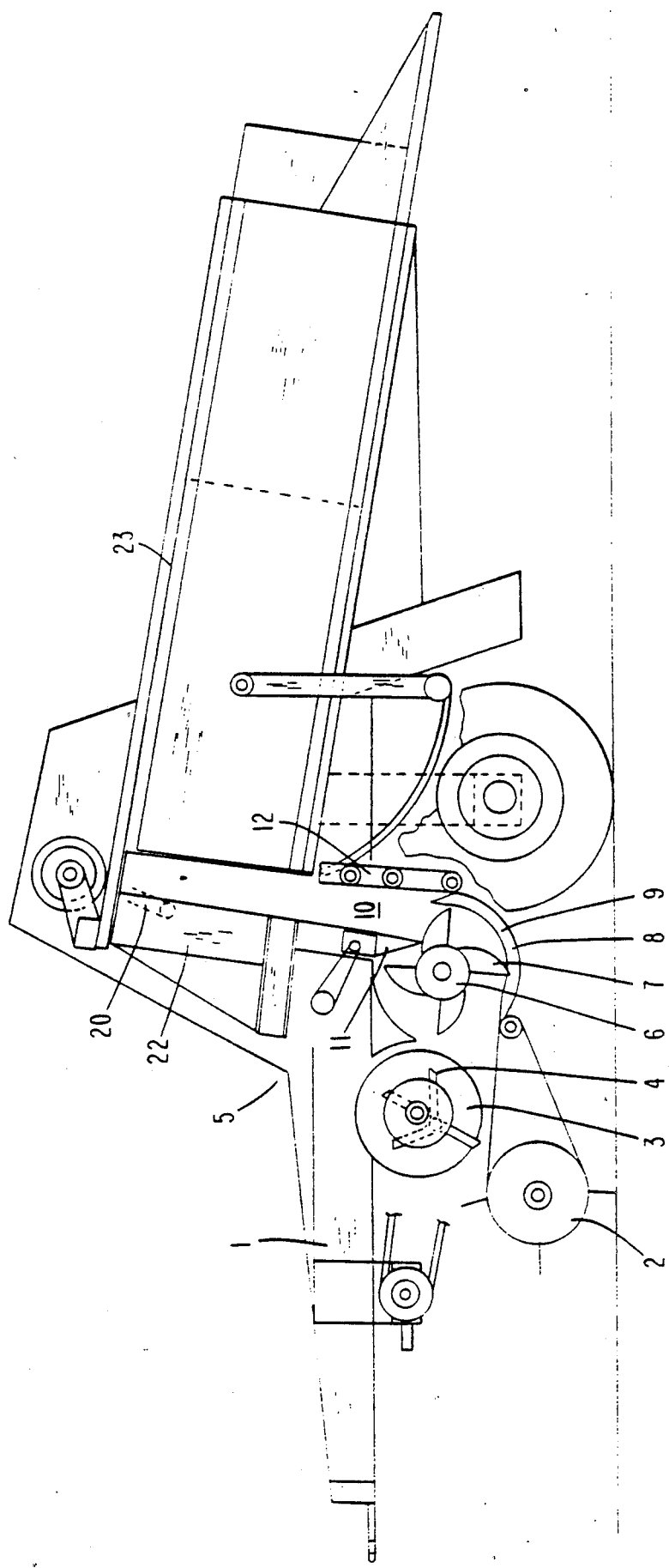
FIG. 5 shows a preferred embodiment with a displaceable lateral wall of the press channel.

FIG. 5 shows a further embodiment having a similar configuration as in FIG. 3, wherein the compressing plate 22 is shown in its retracted position; thus the layer formed in the press channel 10 may be urged into the baling chamber 23.

Figure 6:
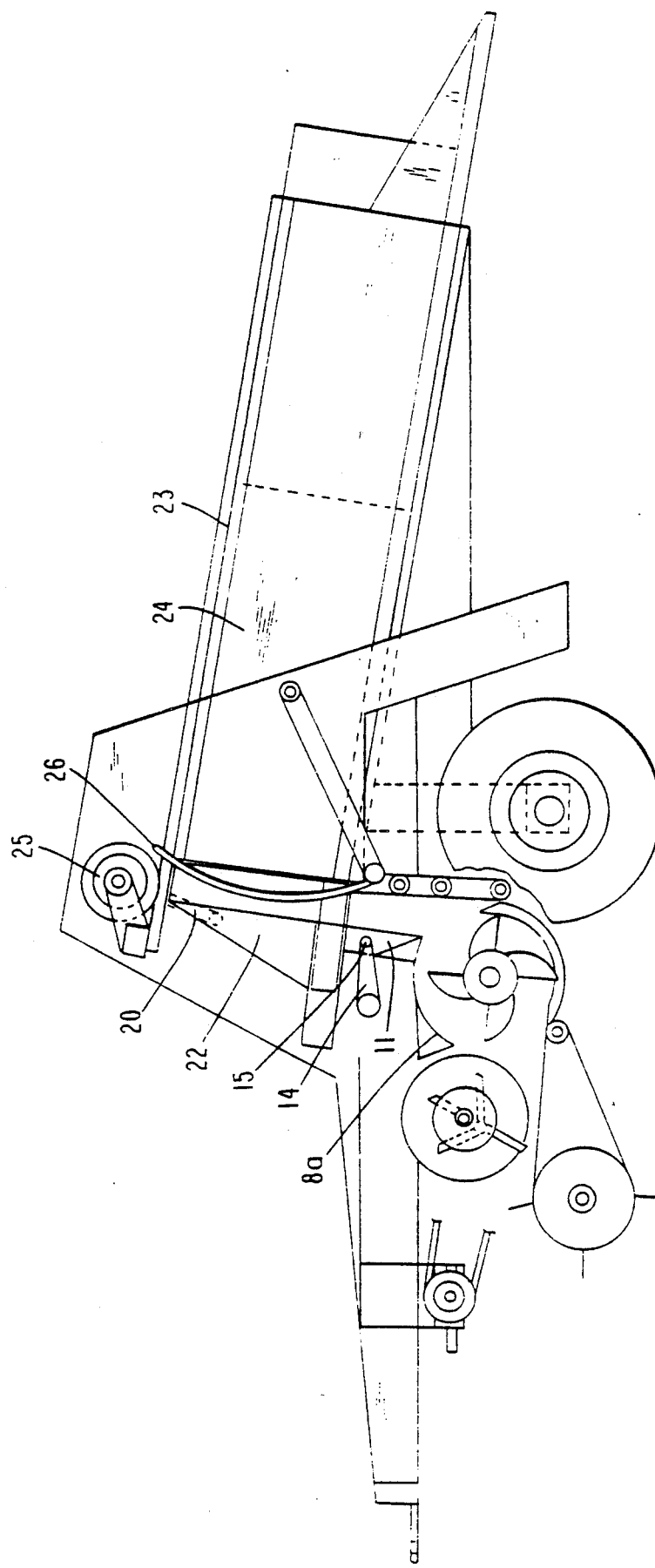
FIG. 6 shows a big baler according FIG. 5 with displaced top wall.

According to FIG. 6 the compressing plate 22 pressing at the flat or main side of the layer is shown in its forward compressing position. Since in continuous operation further field-fodder is compressed between the tines 7 of the drum 6 and the grooves 9 in the drum casing 8 and compacted in the press channel 10, the layer in the press channel 10 might be over-densified. To prevent this, the slotted wall 11 may be lifted while the inlet opening 21 to the baling chamber 23 is closed by the bottom of the compressing plate 22, thus expanding the volume of the press channel 10. By this measure, the layer in a short press channel 10 is not over densified, as the crop fed to the compressing device 5 is not further compacted but merely conveyed around the drum 6 in the portion 8a of the drum casing, whilst the inlet opening 21 of the baling chamber 23 is closed.

Figure 7:
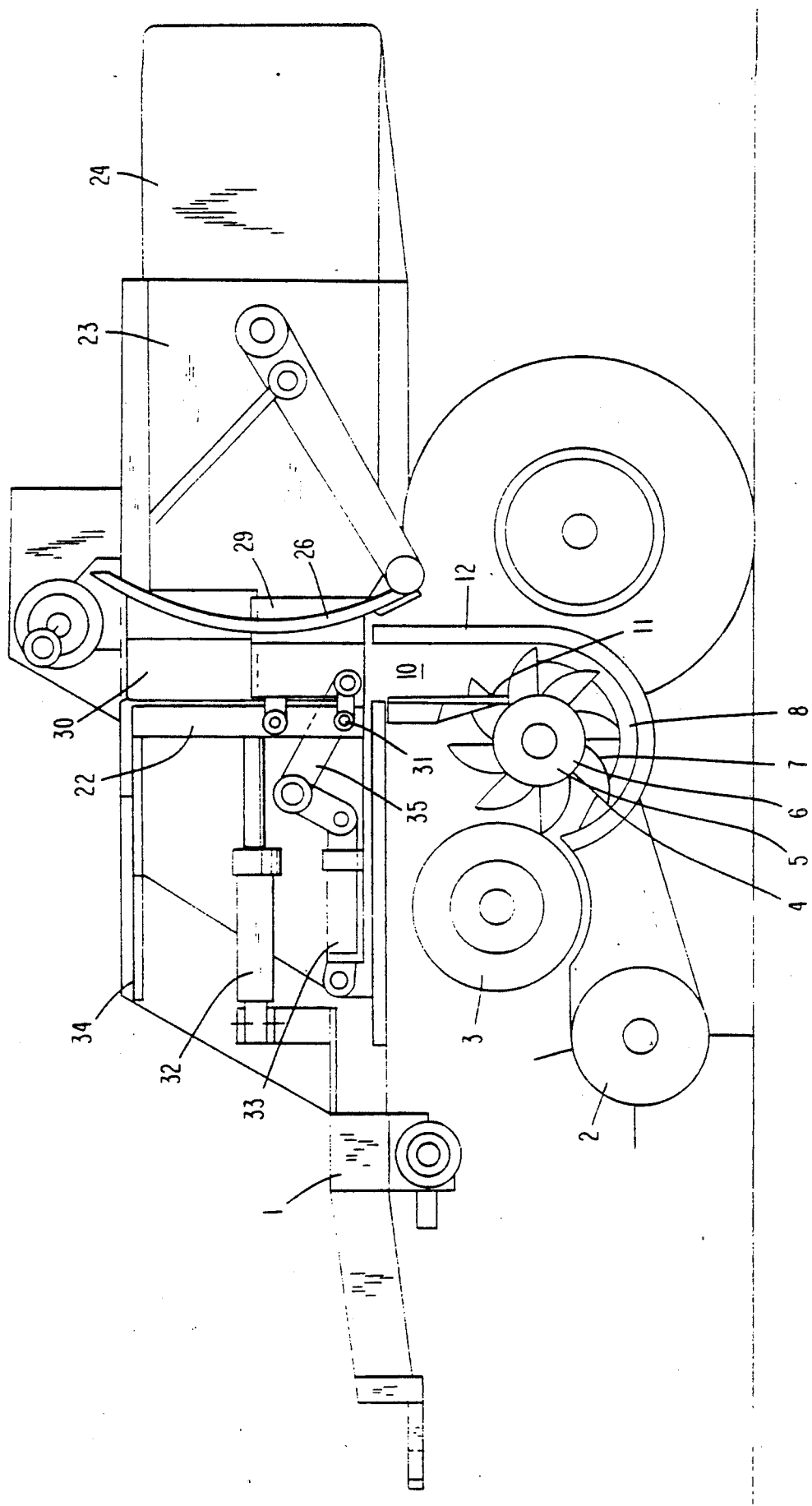
FIG. 7 shows another embodiment of a big baler with a telescopable compressing plate.
Figure 8:
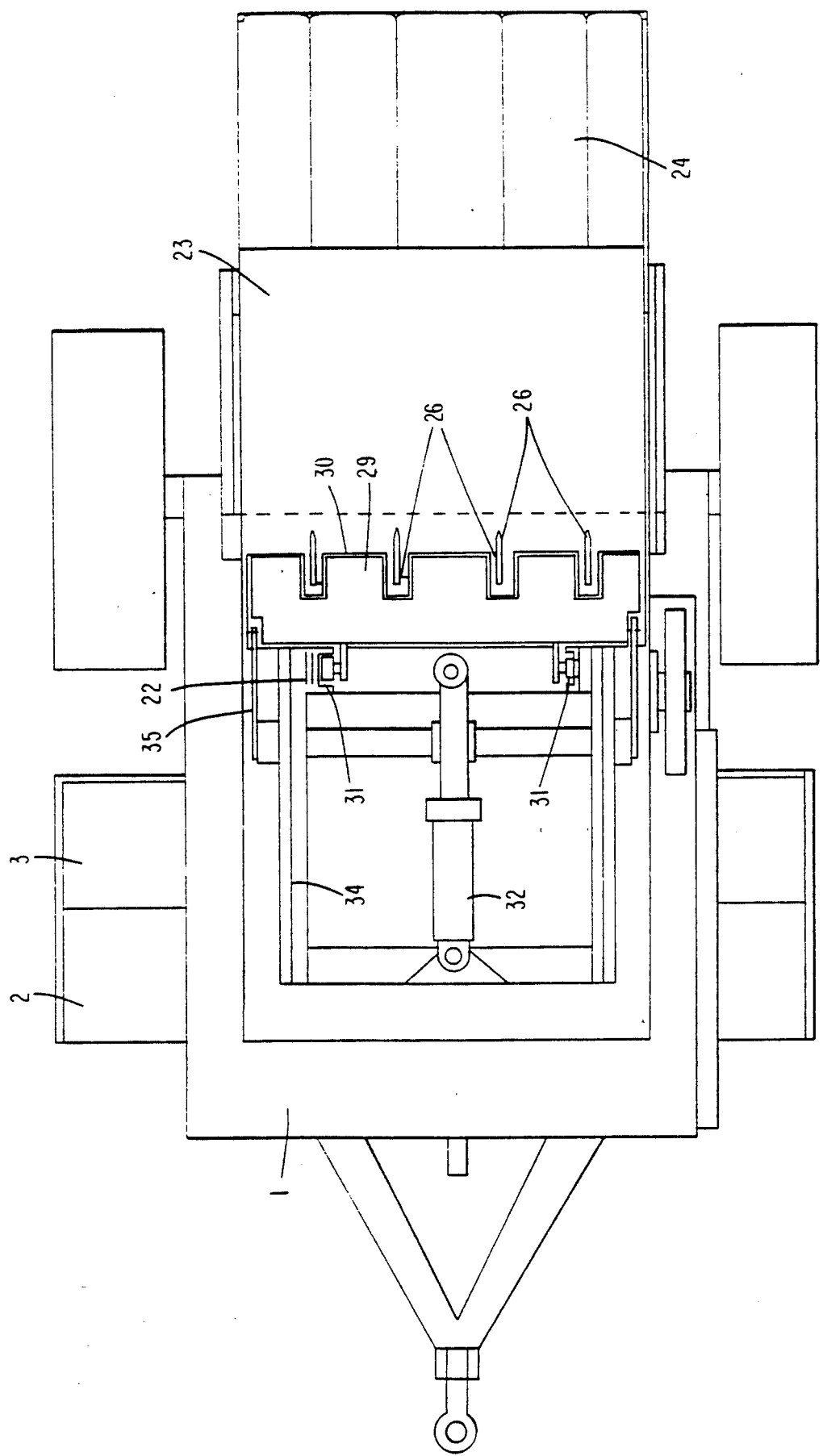
FIG. 8 shows a top view of the baler according to FIG. 7.

The same purpose is obtained by the design according FIGS. 7 and 8, where the compressing plate 22 consists of two parts 29,30, the lower part being telescopable within the upper part 30 or vice versa. The lower part 29 is lifted by the compressed layer continuously fed out of the press channel 10 during the compressing plate 22 remains in its forward position according FIG. 6. The lower part 29 is guided in roller bearings 31 arranged within the compressing plate 22, which is actuated by a hydraulic jack 32. After retrograde movement of the compressing plate 22 along a guide-rail 34 to the position according FIG. 5 by contracting of the hydraulic jack 32, the lower part 29 of the compressing plate 22, which was lifted by the fed-in layer, is lowered by a second hydraulic jack 33 and a pair of lateral levers 35 or by gravity. In this configuration the rectangular bale 24, formed of several layers fed out of the press channel 10 is under permanent compression either by the compressing plate 22 itself or by the partially fed-in layer, thus preventing re-expansation of the rectangular bale 24.

As explained above, by the method and apparatus according to the invention properly shaped and highly densified bales are produced with relatively light-weight and simple compacting means. Thus, the very massive and expensive pitman-and-crank-mechanism of conventional balers necessary to apply a compression pressure of about 800 pounds per square foot can be avoided.

Still other objects and advantages of the present invention will become readily apparent to those skilled in this art from the preceding detailed description, wherein only the preferred embodiments of the invention are illustrated and described, as aforementioned, simply by way of presenting the best modes contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive, the invention being defined solely by the claims appended hereto.

I claim:

1. An apparatus for harvesting of field-fodder like hay, straw and grass-silage and forming substantially rectangular bales thereof in a baling chamber, comprising:
   pick-up means for picking up the field-fodder from the ground;
   a compression drum provided with tines engaging grooves of a drum casing and a slotted top wall of a press channel for shredding and crushing the field-fodder picked up by said pick-up means to a highly densified layer;
   a press channel forming an output of the compression drum, having a slotted portion for permitting passage of the tines and conveying the layer formed in said compression drum, while further densifying the layer, through an inlet opening into said baling chamber; and
   a pressing plate arranged at an end surface of said baling chamber to be reciprocatingly movable in the baling chamber along a longitudinal direction of the baling chamber along said direction toward a discharge opening of the baling chamber,
   wherein said compressing plate comprises at least two portions that are relatively telescopable in said longitudinal direction of said press channel.

2. An apparatus for harvesting of field-fodder like hay, straw and grass-silage and forming substantially rectangular bales thereof in a baling chamber, comprising:
   pick-up means for picking up the filed-fodder from the ground;
   a compression drum provided with tines engaging grooves of a drum casing and a slotted top wall of a press channel for shredding and crushing the field-fodder picked up by said pick-up means to a highly densified layer;
   a press channel forming an output of the compression drum, having a slotted portion for permitting passage of the tines and conveying the layer formed in said compression drum, while further densifying the layer, through an inlet opening into said baling chamber; and
   a pressing plate arranged at an end surface of said baling chamber to be reciprocatingly movable in the baling chamber along a longitudinal direction of the baling chamber for pressing said layers accumulating in said baling chamber along said direction toward a discharge opening of the baling chamber,
   wherein said press channel comprises a slotted top wall that is displaceable along a direction of said press channel, for expanding said press channel while said compressing-plate plunges into said baling chamber.

* * * * *